United States Patent [19]

Osada et al.

[11] Patent Number: 5,795,118
[45] Date of Patent: Aug. 18, 1998

[54] TACKING DEVICE

[75] Inventors: Hiroshi Osada; Hiroyuki Nakaya, both of Yokohama, Japan

[73] Assignee: Nifco, Inc., Kanagawa-ken, Japan

[21] Appl. No.: 811,631

[22] Filed: Mar. 5, 1997

Related U.S. Application Data

[63] Continuation of Ser. No. 526,081, Sep. 11, 1995, abandoned.

[30] Foreign Application Priority Data

Sep. 12, 1994 [JP] Japan ................. 6-243374
Oct. 19, 1994 [JP] Japan ................. 6-280046

[51] Int. Cl.$^6$ ............................. F16B 37/06
[52] U.S. Cl. ............. 411/171; 411/82; 411/258; 411/908
[58] Field of Search ............. 411/15, 258, 930, 411/82, 171, 900, 904, 907, 908

[56] References Cited

U.S. PATENT DOCUMENTS

| | | | |
|---|---|---|---|
| 2,784,758 | 3/1957 | Rohe | 411/171 |
| 4,431,355 | 2/1984 | Jünemann | 411/15 |
| 4,521,148 | 6/1985 | Tanaka | 411/15 |
| 4,636,124 | 1/1987 | Gugle et al. | 411/82 |
| 4,822,224 | 4/1989 | Carl et al. | 411/82 |
| 4,824,304 | 4/1989 | Shibayama et al. | 411/82 |
| 5,261,772 | 11/1993 | Henninger et al. | 411/15 |
| 5,435,679 | 7/1995 | Barry | 411/258 |

FOREIGN PATENT DOCUMENTS

| | | | |
|---|---|---|---|
| 156026 | 12/1985 | European Pat. Off. | 411/15 |
| 3804555 | 8/1989 | Germany | 411/82 |
| 1520155 | 8/1978 | United Kingdom | 411/15 |

*Primary Examiner*—Steven N. Meyers
*Assistant Examiner*—Tuyet-Phuong Pham
*Attorney, Agent, or Firm*—Sughrue, Mion, Zinn, Macpeak & Seas, PLLC

[57] ABSTRACT

A tacking device for tacking a first member to a second member comprises a tacking member having a fusible plate and a pin having a bulged tip and projecting from the lower surface of the fusible plate; and a retaining member having a substantially cylindrical body provided with a plurality of catches on its outer circumference. The tacking member is rotated at a high rotating speed or vibrated with the fusible plate pressed against the first member so that the upper surface of the fusible plate is fused by frictional heat to weld the tacking member to the first member, the pin is inserted in the central hollow of the retaining member so that the expanded tip of the pin is caught by the retaining member to combine the tacking member and the retaining member, and the retaining member is forced into a hole formed in the second member so that the catches engage with the edge of the hole to tack the first member to the second member.

2 Claims, 5 Drawing Sheets

(A)

(B)

(C)

TACKING DEVICE

This is a Continuation of U.S. patent application Ser. No. 08/526,081 filed Sep. 11, 1995 now abandoned.

BACKGROUND OF THE INVENTION

1. Field of the Invention

The present invention relates to a tacking device for fixedly tacking together two separate members, for example, when tacking an automotive interior furnishing, such as a pillar garnish, to the body panel of an automobile. More specificallyit relates to a tacking device capable of firmly tacking together two members even if one of the two members is soft.

2. Description of the Related Art

When tacking a pillar garnish b, i.e., one of automotive interior furnishings, to the body panel c of an automobile, a tacking device a as shown in FIG. 6 disclosed in Japanese Utility Model Publication No. 3-36440 is used to tack the pillar garnish b to the body panel c in a state as shown in FIG. 7. As shown in FIG. 6, the tacking device a has a body d formed by bending a spring metal plate substantially in a U-shape, substantially U-shaped slits e formed in the opposite leg parts of the body d, holding bends f formed by bending portions of the leg parts, between the slits e in a substantially outward convex V-shape, and flanges g formed by bending the free ends of the opposite leg parts outward. As shown in FIG. 7, the tacking device a is combined with the pillar garnish b by putting the tacking device a on the pillar garnish b so that a projection h formed in the pillar garnish b is held between the opposite leg parts of the tacking device a, and then the tacking device a is pressed in a hole i formed in the body panel c-so that the bends f engage with the inner periphery of the hole i to tack the pillar garnish b to the body panel c. Triangular protrusions j formed in the extremities of the flanges g of the tacking device a gnaw into stoppers k formed on the opposite sides of the projection h, respectively, and tongues l projecting inward from the body d gnaw into the protrusion h to hold the tacking device a on the pillar garnish b.

Recently, more automotive interior furnishings including pillar garnishes have been formed of soft materials such as foam materials, to improve the safety of passengers in case of accident. The foregoing conventional tacking device a is unable to be used for tacking interior furnishings formed of a soft materials. If the interior furnishing is formed of a soft material, such as a foam material, the strength firmness of the protrusion h and the stoppers k is not large enough to enable the tacking device a to hold securely to the interior furnishing, such as the pillar garnish b.

SUMMARY OF THE INVENTION

Accordingly, it is an object of the present invention to provide a tacking structure capable of securely tacking a member to another member eve n if the former member is formed of a soft material, and suitable for securely tacking an automotive interior furnishing to the body panel of an automobile.

With the foregoing object in view, the present invention provides a tacking structure for tacking a first member to a second member, comprising: a tacking member having a fusible plate and a pin having an expanded tip and projecting from the lower surface of the fusible plate; and a retaining member having a substantially cylindrical body provided with a plurality of catches on its outer circumference. When tacking the first member to the second member, the tacking member i s rotated at a high rotating speed or vibrated with the fusible plate pressed against the first member so that the upper surface of the fusible plate is fused by frictional heat to weld the tacking member to the first member, the pin is inserted in the central hollow of the retaining member so that the expanded tip of the pin is caught by the retaining member to combine the tacking member and the retaining member, and then the retaining member is forced into a hole formed in the second member so that the catches engage with the edge of the hole to tack the first member to the second member.

A small conical positioning protrusion may be formed at the center of the fusible plate of the tacking member, and a plurality of concentric circular ridges may be formed about the positioning protrusion in the upper surface of the fusible plate to facilitate positioning the tacking member on the first member and fusing the upper surface of the fusible plate. The retaining member may be provided with an elastically deformable flange having an upward tapered periphery around the upper end thereof to prevent the tacking device from rattling relative to the second member.

Since the tacking member is rotated at a high rotating speed or vibrated with the fusible plate pressed against the first member so that the upper surface of the fusible plate is fused by frictional heat to weld the tacking member to the first member, the retaining member is put on the pin, and then the retaining member is forced into a hole formed in the second member so that the catches engage with the edge of the hole to tack the first member to the second member, the first member can be securely tacked to the second member.

A small conical positioning protrusion may be formed at the center of the fusible plate of the tacking member, and a plurality of concentric circular ridges may be formed about the positioning protrusion in the upper surface of the fusible plate to facilitate positioning the tacking member on the first member and fusing the upper surface of the fusible plate. The retaining member may be provided with an elastically deformable flange having upward tapered periphery around the upper end thereof to prevent the tacking device from rattling relative to the second member. Since the fusible plate of the tacking member is welded to the first member by fusing the upper surface of the fusible plate by frictional heat generated by the rotation or vibration of the fusible plate relative to the first member, the tacking member can be firmly and substantially integrally attached to the first member even if the first member is formed of a soft material.

Since the tacking structure of the present invention comprises two members, i.e., the tacking member to be attached to the first member, and the retaining member to be engaged with the second member, the tacking member can be formed of a material suitable for welding selected by taking into consideration the material forming the first member. Even if the tacking member is formed of a material not having a high rigidity, the first member can be firmly tacked to the second member when the retaining member is formed of a material having a sufficient rigidity. Preferably, the tacking member of the tacking device is formed of a material of the same quality as that of the material forming the first member. For example, if the first member is formed of a foamed polypropylene resin, it is preferable to form the tacking member of a polypropylene resin. When the tacking member and the first member are formed of materials of the same quality, the fusible plate of the tacking member and the first member can be firmly and integrally joined together by rotational friction welding. A polypropylene resin has an insufficient rigidity and is unsuitable for forming the retaining member that must firmly hold to the second member. Since the tacking device of the present invention comprises two separate members, i.e., the tacking member and the retaining member, and the retaining member is combined with the pin of the tacking member firmly joined to the first member by rotational friction welding, the retaining member can be formed of a material having a sufficient rigidity, such as a polyoxymethylene resin or the like, so that the tacking device is capable of firmly tacking together the first member and the second member.

When the fusible plate of the tacking member is provided with the small conical positioning protrusion at the center of the upper surface thereof, and the plurality of concentric circular ridges about the positioning protrusion in the upper surface thereof, the tacking member is not dislocated from a predetermined position when joining the tacking member to the first member at the predetermined position by rotational friction welding, and the tacking member can be easily and firmly joined to the first member. When the tacking member is rotated with the fusible plate in contact with the first member at the predetermined position, the positioning protrusion gnaws into the surface of the first member, and the fusible plate can be rotated at a high rotating speed on the positioning protrusion. Therefore, the fusible plate of the tacking member can be surely held at the predetermined position on the first member without being dislocated, so that the fusible plate can be firmly welded at the predetermined position to the first member. Since the concentric circular ridges are formed about the positioning protrusion in the upper surface of the fusible plate, the fusible plate is in line contact with the first member when pressed against the latter, so that the tacking member can be smoothly rotated, frictional heat is concentrated on the circular ridges to fuse the circular ridges efficiently, so that the fusible plate can be satisfactorily welded to the first member. The elastically deformable flange having an upward tapered periphery and formed around the upper end of the retaining member prevents the tacking device from rattling relative to the second member. When the retaining member of the tacking device joined to the first member is pressed in the hole of the second member, the elastically deformable flange is elastically deformed and is pressed elastically against the edge of the hole to prevent the tacking device from rattling relative to the second member.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENT

Figure 1:
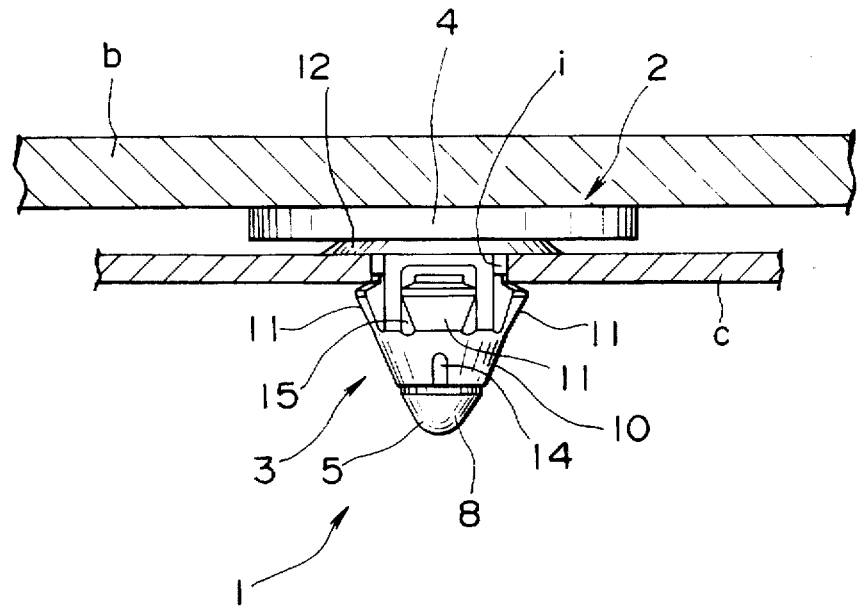
FIG. 1 is a partly sectional front view of a tacking device in a preferred embodiment according to the present invention as applied to tacking a pillar garnish to a body panel of an automobile.
Figure 2:
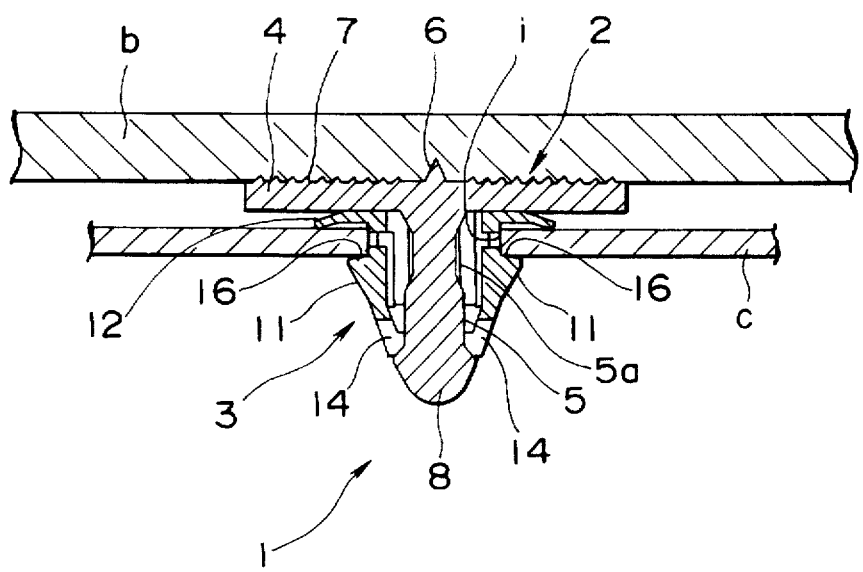
FIG. 2 is a sectional view of the tacking device of FIG. 1 as tacking the first and the second member.
Figure 4:
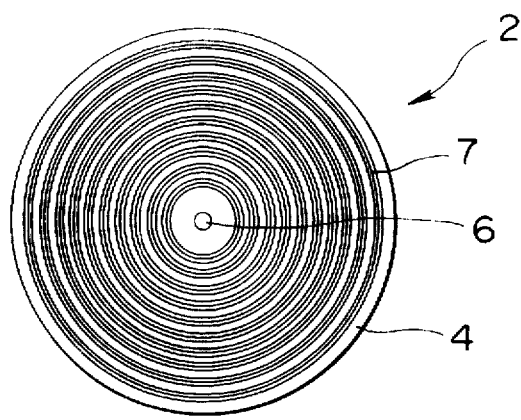
FIGS. 4(A), 4(B) and 4(C) are a top plan view, a front view and a bottom plan view, respectively, of a tacking member included in the tacking device of FIG. 1.
Figure 4:
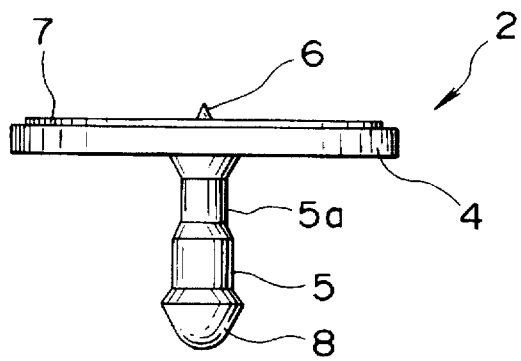
Figure 4:
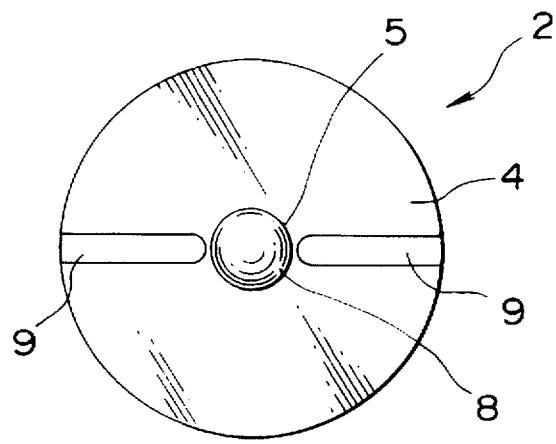

FIGS. 1 and 2 show a tacking device 1 in a preferred embodiment according to the present invention tacking a pillar garnish b, i.e., an automotive interior furnishing, to a body panel c of an automobile. The tacking device 1 comprises two members, i.e., a tacking member 2 to be fixedly joined to the pillar garnish b, and a retaining member 3 placed on the tacking member 2 to be fitted in a hole formed in the body panel c to hold the tacking member 2 securely on the body panel c. As shown in FIGS. 4(A), 4(B) and 4(C), the tacking member 2 has a circular fusible plate 4 and a pin 5 formed integrally with the fusible plate 4 to project from the lower surface of the fusible plate 4. The fusible plate 4 is provided integrally with a small conical positioning protrusion 6 at the center of the upper surface thereof, and a plurality of concentric circular ridges 7 of a triangular section formed in the upper surface thereof about the positioning protrusion 6. The pin 5 has a middle neck portion 5a and a bulged tip 8 of a shape substantially resembling an inverted circular cone. Radial grooves 9 are formed in the lower surface of the fusible plate 4 to extend from positions near the base end of the pin 5 to the periphery of the fusible plate 4, respectively. When joining the tacking member 2 to the pillar garnish b by rotational friction welding, in which the tacking member 2 is rotated under pressure by a friction welder, the jaws of the rotor of the friction welder are brought into engagement with the radial grooves 9.

The tacking member 2 is rotated at a high rotating speed with the fusible plate 4 pressed against the pillar garnish b and, consequently, the upper surface of the fusible plate 4 is fused by frictional heat and thereby the fusible plate 4 is welded to the pillar garnish b. Therefore, the tacking member 2 is formed of a thermoplastic material, such as a polypropylene resin or a polyacetal resin. Although there is no particular restriction on the material forming the tacking member 2, it is preferable that the tacking member 2 is formed of a material of the same quality as that of the material forming the pillar garnish b; for example, when the pillar garnish b is formed of a foamed polypropylene resin, the tacking member 2 is formed of a polypropylene resin.

Figure 5:
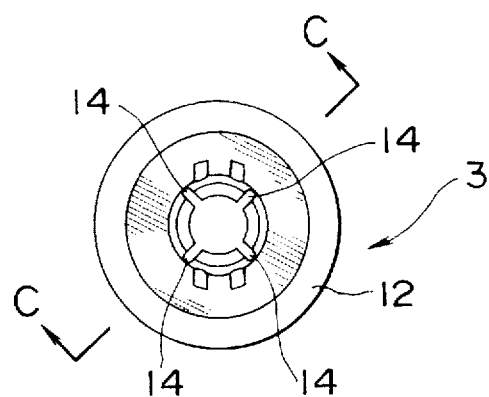
FIGS. 5(A), 5(B), 5(C) and 5(D) are a top plan view, a front view, a sectional view taken on line C—C in FIG. 5(A) and a bottom plan view, respectively, of a retaining member included in the tacking device of FIG. 1.
Figure 5:
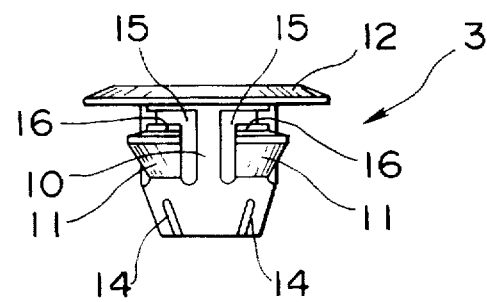
Figure 5:
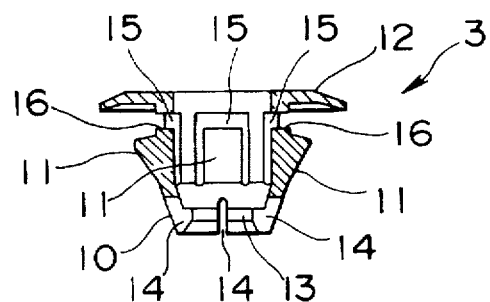
Figure 5:
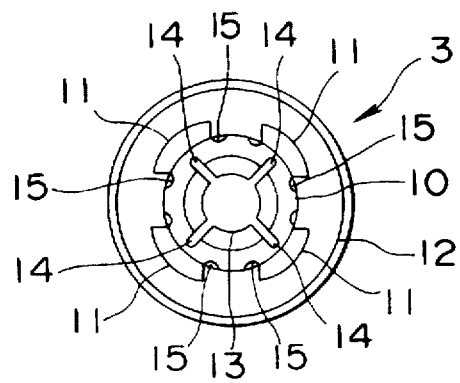
Figure 6:
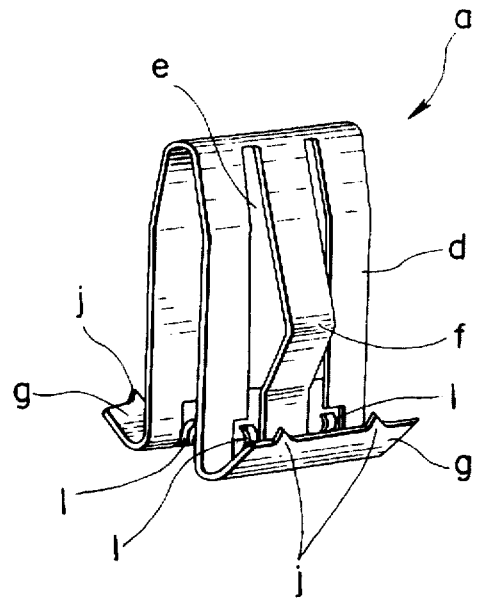
FIG. 6 is a perspective view of a prior art tacking device.
Figure 7:
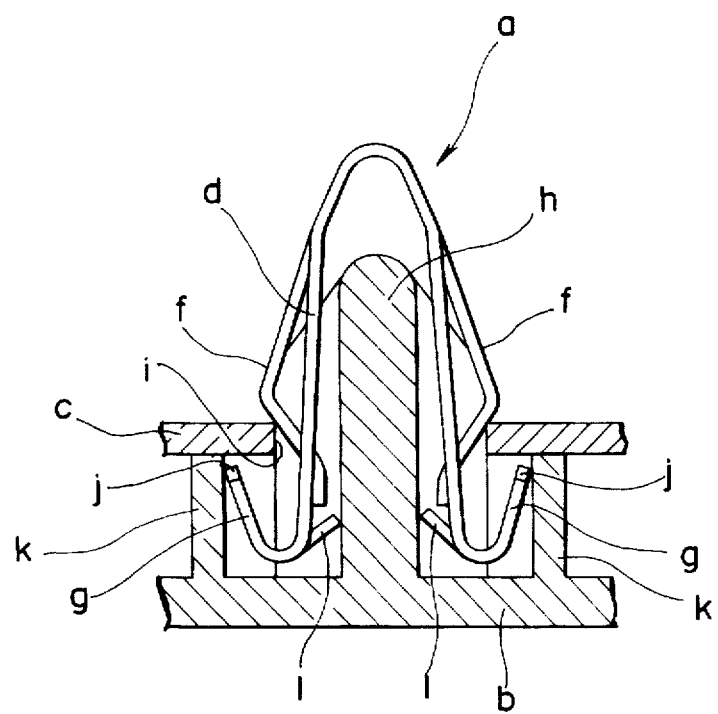
FIG. 7 is a sectional view of the tacking device of FIG. 6 as applied to tacking a first member to a second members.

As shown in FIGS. 5(A) to 5(D), the retaining member 3 has a body 10 shaped as a circular cylinder, four catches 11 formed on the outer circumference of the body 10, and a flange 12 formed around the upper end of the body 10. The body 10 of the retaining member 3 is tapered downward, as viewed in FIG. 5(B), the center hole of the body 10 also is tapered moderately downward, and a circular projection 13 is formed on the inner circumference of the lower end of the body 10 as shown in FIG. 5(C). Four axial slits 14 are formed in the lower end portion of the body 10 at equal angular intervals to split the lower end portion of the body 10 into four jaws. Four slots 15 of a shape substantially resembling the inverted letter U are formed in the upper portion of the body 10 at equal angular intervals. Each slot 15 is formed to surround the three sides of the catch 11 so that the catch 11 is elastically deformable. Each catch 11 is tapered downward in a substantially wedge shape, and a step 16 is formed on the upper end of the catch 11. The flange 12 has an upward tapered periphery and is elastically deformable.

The lower portion of the retaining member 3 below the flange 12 is inserted in a hole i formed in the body panel c of the automobile so that the catches 11 engage with the edge of the hole i to retain the tacking member 2 joined to the pillar garnish b on the body panel c. The retaining member 3 is formed of a material having a moderate rigidity and moderate flexibility, such as a polyoxymethylene resin, nylon 6 resin, nylon 6.6 resin or a resin containing a nylonresin. No problem arises at all even if the tacking member 2 is formed of a material different from that of the retaining member 3.

Figure 3:
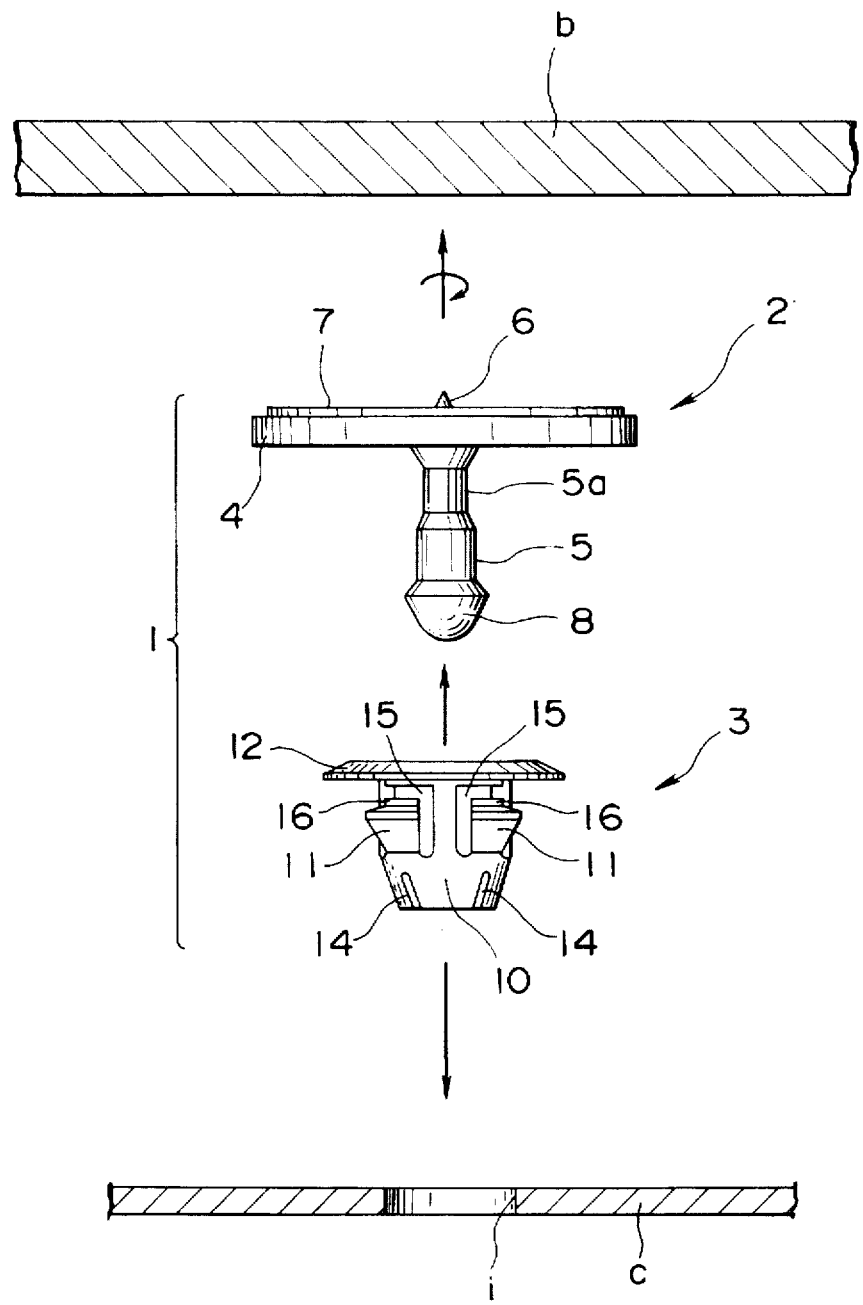
FIG. 3 is an exploded front view of the tacking device of FIG. 1.

Referring to FIG. 3, when tacking the pillar garnish c to the body panel c of the automobile with the tacking device 1 in a state as show n in FIGS. 1 and 2, first the tacking member 2 is joined to the pillar garnish b by rotational friction welding. When joining the tacking member 2 to the pillar garnish b by rotational friction welding, the upper surface of the fusible plate 4 is pressed against the pillar garnish b at a predetermined position and the tacking member 2 is rotated at a high rotating speed under pressure to fuse the upper surface of the fusible plate 4 by frictional heat so that the tacking member 2 is welded to the pillar garnish b. The positioning protrusion 6 formed at the center of the upper surface of the fusible plate 4 gnaws into the pillar garnish b and the fusible plate 4 rotates on the positioning protrusion 6, so that the fusible plate 4 of the tacking member 2 can be surely held at a predetermined position and will not be dislocated. Since the upper surface of the fusible plate 4 is provided with the plurality of concentric circular ridges 7 about the positioning protrusion 6, the fusible plate 4 is in line contact with the pillar garnish b when pressed against the pillar garnish b, so that the tacking member 2 can be smoothly rotated, and frictional heat is concentrated on the circular ridges 7 to fuse the circular ridges 7 efficiently.

When the tacking member 2 and the pillar garnish b are formed of materials of the same quality, respectively, the tacking member 2 can be more securely welded to the pillar garnish b. For example, the tacking member 2 formed of a polypropylene resin (not foamed) can be securely joined to the pillar garnish b formed of a foamed polypropylene resin by rotational friction welding so that the fusible plate 4 and the pillar garnish 6 are fused each other to be integrally formed. When rotating the tacking member 2 for rotational friction welding to weld the tacking member 2 to the pillar garnish b, the jaws, not shown, of the rotor of the friction welder are brought into engagement with the radial grooves 9 (FIG. 4(C)) formed in the lower surface of the fusible plate 4 to rotate the tacking member 2.

Referring again to FIG. 3, the retaining member 3 is placed on the pin 5 of the tacking member 2 welded to the pillar garnish b. The pin 5 of the tacking member 2 is pushed into the body 10 of the retaining member 3. Consequently, the bulged tip 8 of the pin 5 comes into contact with the inner circumference of the smaller lower end portion of the body 10, bends radially outward the four jaws formed by forming the four axial slits 14 in the lower end portion of the body 10 at equal angular intervals, expanding the lower end portion of the body 10, and passes through the body 10. Then, the jaws of the body 10 snap back to their original positions and the lower end of the body 10 engages with the bulged tip 8 of the pin 5, so that the retaining member 3 is firmly combined with the tacking member 2 as shown in FIG. 2. Then, the retaining member 3 thus combined with the tacking member 2 joined to the pillar garnish b is pressed in the hole i of the body panel c. The catches 11 are bent elastically and radially inward as the catches 11 pass through the hole i, and then the catches 11 snap back to their original positions after passing through the hole i, and the upper ends of the catches 11 engages with the edge of the hole i. Thus, the pillar garnish b is tacked securely to the body panel c by the tacking device 1. Since pin 5 has the middle neck portion 5a formed by reducing a portion thereof corresponding to the catches, a space large enough to allow the radially inward bending of the catches 11 when the catches 11 pass through the hole i is formed between the pin 5 and the body 10 as shown in FIG. 2. As shown in FIGS. 1 and 2, the flange 12 of the retaining member 3 is deformed elastically and pressed against the surface of the body panel c when the upper end of the catches 11 engage with the edge of the hole i to hold the body panel c resiliently between the catches 11 and the flange 12. On the other hand, the steps 16 formed on the upper ends of the catches 11 are pressed resiliently against the circumference of the hole i to restrain the retaining member 3 from radial movement. Thus, tacking device 1 restrains itself from the axial and radial movement relative to the body panel c.

Since the tacking member 2 and the retaining member 3 are separate members, the retaining member 3 may be formed of a material having a moderate rigidity and moderate flexibility, such as a polyoxymethylene resin and can be firmly secured to the body panel c even if the tacking member 2 is formed of a material having a low rigidity, such as a polypropylene resin.

Since the tacking device 1 having the tacking member 2 having the fusible plate 4 firmly and integrally welded to the pillar garnish b is firmly joined to the body panel c so that the tacking device 1 may not rattle on the body panel c, the pillar garnish b can be securely held on the body panel c so that the pillar garnish b may not rattle on the body panel c.

When the pillar garnish b is tacked to the body panel c with a plurality of tacking devices like the interior furnishing tacking device 1 of the present invention, slots may be formed instead of the hole i in the body panel c to absorb the movement of the tacking devices due to the thermal expansion or thermal contraction of the pillar garnish b. Since the four catches 11 of the retaining member 3 of the tacking device 1 are arranged at equal angular intervals, and are tapered downward so that the width of the upper ends thereof is comparatively large, the catches 11 are able to engage with the edge of the slot.

Since the tacking member 2 of the tacking device 1 is joined to the pillar garnish b by rotational friction welding, the tacking member 2 can be surely joined to the pillar garnish b and the pillar garnish b can be surely tacked to the body panel c even if the pillar garnish b is formed of a soft material, such as a foamed material, and the retaining member 3 of the tacking device 1 secures firmly the tacking member 2 joined to the pillar garnish b on the body panel c.

When removing the pillar garnish b from the body panel c to replace the pillar garnish b with a new one, the tacking member 2 joined to the pillar garnish b can be separated from the retaining member 3 by forcibly pulling the tacking member 2 out of the retaining member 3 without removing the retaining member 3 from the body panel c. Since the shoulder of the bulged tip 8 of the pin 5 is tapered upward and the lower portion of the inner surface of the circular projection 13 is tapered upward as best shown in FIG. 5(C), the lower end of the body 10 of the retaining member 3 is expanded forcibly by the wedging action of the tapered shoulder of the circular projection 13 on the tapered inner surface of the body 10 when the tacking member 2 is pulled forcibly. As a result the pin 5 of the tacking member 2 can be pulled out of the retaining member 3 and, consequently, the pillar garnish b can be removed together with the tacking member 2 from the body panel c. Since the catches 11 are surely in engagement with the edge of the hole i of the body panel c, the retaining member 3 remains on the body panel c. When replacing the pillar garnish b with a new one, another tacking member 2 is joined to the new pillar garnish by rotational friction welding, and then the tacking member 2 is snapped into the retaining member 3 remaining on the body panel c to tack the new pillar garnish to the body panel c.

The present invention is not limited to the tacking device specifically described above. For example, the positioning protrusion 6 and the concentric circular ridges 7 of the fusible plate 4 of the tacking member 2 are not necessarily indispensable structures of the tacking device and may be omitted. When the fusible plate 4 of the tacking member 2 is not provided with the positioning protrusion 6 and the concentric circular ridges 7, the fusible plate 4 may be joined to a member, such as a pillar garnish, by vibrational friction welding. The fusible plate 4 need not necessarily be a circular plate; the same may be of any other suitable shape, such as a elliptic shape, a rectangular shape or a polygonal shape. Various changes may be made in the constitution of the preferred embodiment including the shapes of the pin 5 of the tacking member 2 and the catches 11 of the retaining part 3 without departing from the spirit of the present invention. The fusible plate 4 of the tacking member 2 may be welded to the pillar garnish b after combining the tacking member 2 and the retaining member 3 instead of before combining the tacking member 2 and the retaining member 3 as described in connection with the preferred embodiment. The tacking member 2 welded to the pillar garnish b may be joined to the retaining member 3 previously inserted in the hole i of the body panel c. The tacking device of the present invention may be used for tacking various furnishings other than automotive interior furnishings formed of soft materials, such as the pillar garnishes and for tacking fixtures other than interior furnishings.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A tacking structure comprising a first member formed of a thermoplastic resin; a second member to be tacked to said first member;

a tacking member formed of a thermoplastic resin compatible with that of a thermoplastic resin forming said first member to be attached, said tacking member having a fusible plate and a pin having a bulged tip and projecting from a lower surface of the fusible plate; and a retaining member which is formed of another material having a sufficient rigidity greater than a material of the tacking member, having a substantially cylindrical body provided with a plurality of catches on its outer circumference;

the tacking member being rotated at a high rotating speed or vibrated with the fusible plate when pressed against said first member so that an upper surface of the fusible plate will be fused by frictional heat to weld the tacking member to said first member, the pin being inserted in a central hollow of the retaining member so that an expanded tip of the pin is caught by the retaining member to combine the tacking member and the retaining member, and the retaining member being forced into a hole formed in said second member so that the catches engage with the edge of the hole for attachment of said first member to said second member;

wherein the fusible plate of the tacking member is provided on its upper surface with a small rigid conical positioning protrusion at a center of the upper surface, and a plurality of concentric circular ridges formed about the positioning protrusion, and the tacking member is joined to the first member at a predetermined position by rotational friction welding.

2. A tacking structure according to claim 1, wherein the body of the retaining member is provided at its upper end with a flexible flange having a tapered peripheral portion tapering upward.

* * * * *